United States Patent
Frederick et al.

(10) Patent No.: US 7,760,207 B2
(45) Date of Patent: Jul. 20, 2010

(54) IMAGE DISPLAY ADJUSTMENT SYSTEM AND METHOD

(75) Inventors: John W. Frederick, Spring, TX (US); Christopher D. Voltz, Spring, TX (US); Clinton B. Yearwood, Houston, TX (US); Louis E. Leclerc, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 669 days.

(21) Appl. No.: 11/588,602

(22) Filed: Oct. 27, 2006

(65) Prior Publication Data

US 2008/0100641 A1  May 1, 2008

(51) Int. Cl.
- G09G 5/00 (2006.01)
- G09G 1/06 (2006.01)
- G06T 1/60 (2006.01)
- H04N 5/53 (2006.01)
- H04N 5/57 (2006.01)
- H04N 5/50 (2006.01)

(52) U.S. Cl. ............. 345/581; 345/699; 345/619; 345/530; 345/12; 348/678; 348/687; 348/735; 715/274

(58) Field of Classification Search ............ 345/428, 345/581, 589, 617–619, 690, 699, 1.1, 3.4, 345/10–13, 20, 63, 67, 12, 530, 538, 553; 348/528, 536, 602, 604, 627, 678, 673–674, 348/686–687, 719, 735; 715/274, 815
See application file for complete search history.

(56) References Cited

U.S. PATENT DOCUMENTS

| | | | |
|---|---|---|---|
| 5,477,241 A | 12/1995 | Higgins et al. | |
| 5,650,857 A | 7/1997 | Cole et al. | |
| 6,061,048 A | 5/2000 | Choi | |
| 6,169,535 B1 | 1/2001 | Lee | |
| 6,262,718 B1* | 7/2001 | Findlay et al. | 345/178 |
| 6,359,389 B1 | 3/2002 | Medina et al. | |
| 2005/0190178 A1* | 9/2005 | Taghavi et al. | 345/418 |
| 2005/0212786 A1* | 9/2005 | Nitta et al. | 345/204 |
| 2005/0248777 A1* | 11/2005 | Kim | 358/1.2 |
| 2006/0007223 A1* | 1/2006 | Parker | 345/207 |
| 2006/0017743 A1* | 1/2006 | Chan et al. | 345/589 |
| 2006/0256127 A1* | 11/2006 | Cho et al. | 345/591 |
| 2006/0268180 A1* | 11/2006 | Chou | 348/673 |
| 2007/0052696 A1* | 3/2007 | Uehara | 345/204 |
| 2007/0055161 A1* | 3/2007 | Garg et al. | 600/458 |
| 2007/0291048 A1* | 12/2007 | Kerofsky | 345/589 |
| 2008/0018593 A1* | 1/2008 | Park et al. | 345/156 |
| 2008/0111882 A1* | 5/2008 | Tsai | 348/115 |
| 2008/0144051 A1* | 6/2008 | Voltz et al. | 358/1.2 |
| 2009/0009607 A1* | 1/2009 | Dalgaard | 348/181 |
| 2009/0153435 A1* | 6/2009 | Butler | 345/1.3 |

* cited by examiner

Primary Examiner—Wesner Sajous

(57) ABSTRACT

An image display adjustment system comprises a display setup application executable by a processor and configured to, in response to detecting at least one characteristic associated with a display device, automatically cause an adjustment image to be displayed on the display device and an image adjustment process to be performed for the display device using the adjustment image.

19 Claims, 2 Drawing Sheets

IMAGE DISPLAY ADJUSTMENT SYSTEM AND METHOD

BACKGROUND

Different types of electronic devices (e.g., computer systems, gaming devices, media players, etc.) may be coupled to different types and/or sizes of display devices (e.g., liquid crystal displays (LCDs), cathode ray tubes (CRTs), etc.) for displaying image content thereto. Further, the image content processing component(s) of the different types of electronic devices (and even for the same type of electronic device (e.g., different types/manufactures of graphics cards for a computer system)) can vary. Thus, the appearance and characteristics of image content displayed on a particular display device can vary considerably. Further, although a user of the electronic device/display device may attempt to perform various adjustment processes to correct and/or enhance the display of visual content, the adjustment process is time-consuming, difficult to perform, and oftentimes dependent upon the image content displayed by the user when performing the adjustment process.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
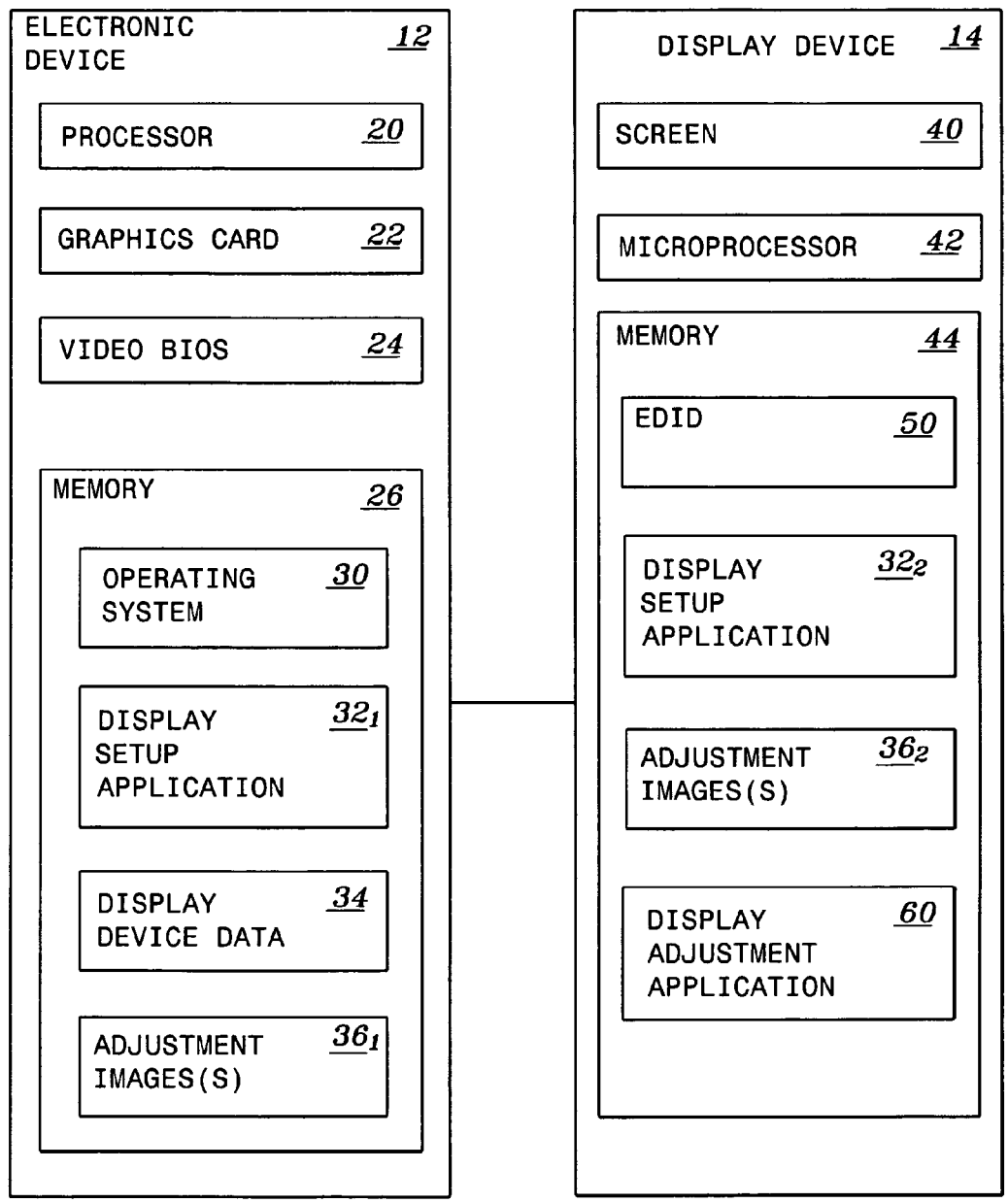
FIG. 1 is a diagram illustrating an embodiment of an image display adjustment system.
Figure 2:
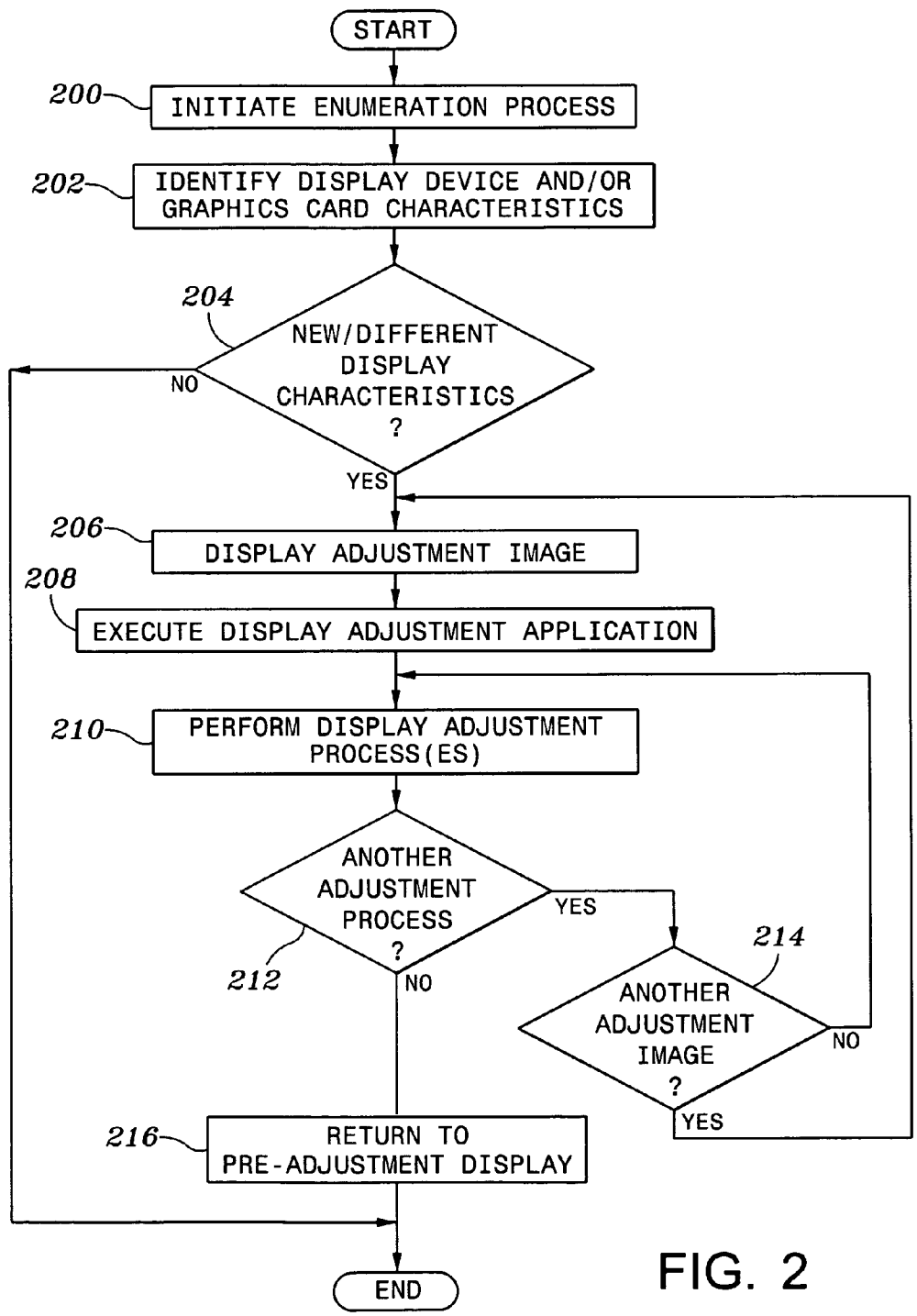
FIG. 2 is a flow diagram illustrating an embodiment of an image display adjustment method.

The preferred embodiments of the present invention and the advantages thereof are best understood by referring to FIGS. 1 and 2 of the drawings, like numerals being used for like and corresponding parts of the various drawings.

FIG. 1 is a diagram illustrating an embodiment of an image display adjustment system 10. In the embodiment illustrated in FIG. 1, system 10 comprises an electronic device 12 communicatively coupled to a display device 14. Electronic device 12 may comprise any type of device configured to output image content for display on display device 14, such as, but not limited to, a computer system, a television, a digital video disk (DVD) player, a gaming device, and a satellite receiver. Display device 14 may comprise any type of device for displaying image content received from electronic device 12, such as, but not limited to, a liquid crystal display (LCD) device, a cathode ray tube (CRT), and a plasma display device.

In the embodiment illustrated in FIG. 1, electronic device 12 comprises a processor 20, a graphics card 22, a video basic input/output system (BIOS) 24, and a memory 26. Graphics card 22 may comprise any type of electronic card for producing and/or otherwise rendering image content for display on display device 14. However, it should be understood that in some embodiments, electronic device 12 may be configured without graphics card 22 (e.g., if a graphics capability is otherwise implemented in electronic device 12 such as, but not limited to, built into a motherboard or other component of electronic device 12). In FIG. 1, a single graphics card 22 is illustrated; however, it should be understood that multiple graphics cards 22 may be implemented in electronic device 12. Video BIOS 24 is configured to perform an enumeration process during a power-on self-test (POST) process or other boot or start-up procedure to identify and/or otherwise determine various characteristics and/or properties associated with graphics card 22 and/or display device 14.

In FIG. 1, memory 26 comprises an operating system 30, a display setup application $32_1$, display device data 34, and one or more adjustment images $36_1$. Operating system 30 and/or display setup application $32_1$ may comprise software, hardware, firmware, or a combination thereof. In some embodiments, operating system 30 and/or display setup application $32_1$ comprise an ordered set of instructions executable by processor 20. Display setup application $32_1$ is used to automatically determine whether a display adjustment process should be performed associated with display device 14 and, if so, to automatically initiate the display adjustment process. For example, in some embodiments, display setup application $32_1$ evaluates information associated with a particular display device 14 coupled to electronic device 12 to determine whether the particular display device 14 is a new and/or different from a previously connected display device 14. For example, different types of display devices 14 have different resolutions, refresh rates, screen dimensions, color depth characteristics, etc. Further, different graphics cards 22 have different output characteristics (e.g., different analog signal output voltages for different color channels resulting from component tolerances or otherwise). Thus, different display devices 14 and/or different display device 14/graphics card 22 combinations can result in different types of image content display irregularities and/or inconsistencies. Accordingly, embodiments of system 10 evaluate a particular display device 14 coupled to electronic device 12 and/or the particular combination of graphics card 22/display device 14 to automatically perform, if necessary, one or more image quality and/or display adjustment processes. In FIG. 1, display setup application $32_1$ illustrated as being stored on electronic device 12; however, it should be understood that in some embodiments, display setup application $32_1$ is stored on display device 14 (e.g., illustrated in FIG. 1 as display setup application $32_2$) such that code associated with display setup application $32_2$ is downloadable to electronic device 12 from display device 14 for execution by processor 20.

Display device data 34 comprises information associated with display device 14 and/or graphics card 22. For example, display device data 34 may comprise various types of information associated with display device 14 such as, but not limited to, a resolution, a refresh rate, color depth characteristics, screen dimensions, etc. Display device data 34 may also comprise information associated with the combination of graphics card 22 and display device 14 (e.g., information associated with the particular graphics card 22 that will be used in cooperation with display device 14 for generating image content to be displayed on display device 14, especially if multiple graphics cards 22 are available on electronic device 12). In some embodiments, display device data 34 is retrieved and/or otherwise obtained by video BIOS 24 and stored in memory 26 so as to be accessible and/or otherwise available to display setup application $32_1$. However, it should be understood that display device data 34 may be otherwise obtained and elsewhere stored.

Adjustment image(s) $36_1$ comprises one or more images having one or more predefined patterns, color schemes and/or content layouts that are automatically displayed on display device 14 and used to perform one or more image quality and/or display adjustment processes. Preferably, a single adjustment image $36_1$ is usable for multiple display adjustment processors. However, it should be understood that different adjustment images $36_1$ may be used for different types of display adjustment processors such that, after completion of a particular display adjustment process and/or after a predetermined time-out period, one adjustment image $36_1$ is replaced with a display of another adjustment image $36_1$ to accommodate a different display adjustment process. Thus, adjustment image(s) $36_1$ comprise predetermined image content to be displayed on display device 14 during a display adjustment process that are configured to result in improved results of the display adjustment process. Adjustment image(s) $36_1$ may comprise a pre-rendered bitmap, an image generated by executing code by processor 20 (e.g., on-the-fly or as needed), a vector image, or otherwise. In FIG. 1, adjustment image(s) $36_1$ is illustrated as being stored on electronic device 12; however, it should be understood that in some embodiments, adjustment image(s) $36_1$ is stored on display device 14 (e.g., illustrated in FIG. 1 as adjustment image $36_2$) such that adjustment image(s) $36_2$ (e.g., a bitmap and/or executable code) is downloadable to electronic device 12 from display device 14.

In the embodiment illustrated in FIG. 1, display device 14 comprises a display screen 40, a microprocessor 42 and a memory 44. Display screen 40 may comprise any type of screen for displaying image content on display device 14 based on the type of display device 14. In FIG. 1, memory 44 comprises extended display identification data (EDID) 50 associated with display device 14. EDID 50 generally comprises a data structure to enable a host device and/or graphics card (e.g., electronic device 12/graphics card 22) to obtain characteristics and/or information about the identity, capabilities and/or settings associated with display device 14. For example, EDID 50 may comprise data in the form of established timings, standard timings, detailed timings and/or other data descriptors such that a particular location and/or value of a bit/byte of data is usable by electronic device 12 to derive a manufacturer of display device 14, a model number associated with display device 14, timings supported by display device 14, a size of screen 40, luminance data, pixel mapping data, etc. However, it should be understood that EDID 50 may comprise different and/or additional types of information associated with display device 14. In some embodiments, EDID 50 is retrieved and/or otherwise obtained by electronic device 12 via a display data channel (DDC) (e.g., by video BIOS 24 and/or a video driver during a start-up or initialization process or otherwise) and is stored in memory 26 of electronic device 12 as display device 34. However, it should be understood that characteristics associated with display device 14 may be retrieved and/or otherwise obtained by electronic device 12 (e.g., by methods other than using a DDC or EDID information).

In the embodiment illustrated in FIG. 1, a display adjustment application 60 is illustrated as being stored in memory 44. Display adjustment application 60 may comprise software, hardware, firmware, or a combination thereof. In some embodiments, display adjustment application 60 comprises an ordered set of instructions executable by microprocessor 42. In operation, display adjustment application 60 is used to perform one or more display adjustment processes for display device 14 during display of adjustment image(s) 36. For example, display setup application 32 automatically causes adjustment image(s) 36 to be displayed on display device 14 and instructs and/or otherwise causes display adjustment application 60 to execute or perform an auto-adjust process to center and/or size image content on screen 40 of display device 14 and/or instructs and/or otherwise causes display adjustment application 60 to execute or perform an image quality adjustment (e.g., a color adjustment process to adjust display device 14 for the analog input video signal levels (e.g., to scale output voltages associated with graphics card 22)). It should be understood that display adjustment application 60 may be used to perform different types of display adjustment processes on display device 14.

Thus, in operation, in response to detecting a new or different display device 14 coupled to electronic device 12, a new or different graphics card 22 for providing image content to display device 14, or detecting a different mode of image content display, display setup application 32 automatically causes adjustment image(s) 36 to be displayed on display device 14 and automatically invokes or causes to be executed display adjustment application 60 to perform one or more display adjustment processes for display device 14 while adjustment image(s) 36 are displayed on display device 14. In some embodiments, display setup application 32 is automatically executed after loading operating system 30. However, it should be understood that display setup application 32 may be executed at different stages of electronic device 12 operation. For example, in some embodiments, display setup application 32 is configured to automatically cause adjustment image(s) 36 to be displayed on display device 14 and automatically invoke or cause to be executed display adjustment application 60 to perform one or more display adjustment processes for display device 14 while adjustment image(s) 36 are displayed on display device 14 based on a function of time (e.g., according to a predetermined schedule or interval of use such that, periodically, adjustment image 36 is automatically displayed and an image quality and/or display adjustment is performed), in response to detecting a change in a thermal condition associated with display device 14, as a result of a user request (e.g., via a software control panel), or in response to other events.

In some embodiments, display setup application 32 cooperates and/or otherwise communicates with display adjustment application 60 of display device 14 to determine whether a particular display adjustment process has been completed to facilitate the cessation of a display of a particular adjustment image 36 and/or the display of another adjustment image 36 for a different display adjustment process. It should also be understood that display of a particular adjustment image 36 may cease after a predetermined time-out period. Further, it should be understood that all or a portion of display adjustment application 60 may be stored on electronic device 12. Accordingly, it should be understood that various components and/or functions of system 10 may be implemented in either electronic device 12 or display device 14.

FIG. 2 is a flow diagram illustrating an embodiment of an image display adjustment method. The method begins at block 200, where video BIOS 24 performs an enumeration process. At block 202, video BIOS 24 identifies display device 14 and/or various display-related characteristics associated with display device 14 (e.g., EDID 50) and information associated with graphics card 22. However, it should be understood that in some embodiments, the enumeration process and/or obtaining various display-related characteristics associated with display device 14 and/or graphics card 22 may be performed by display setup application 32 or another application running on operating system 30. In the embodiment illustrated in FIG. 2, at decision block 204, a determination is made whether display characteristics associated with display device 14 and/or graphics card 22 are new and/or different relative to electronic device 12. For example, display setup application 32 accesses display device data 34 to determine whether display device 14, graphics card 22, or the particular display device 14/graphics card 22 combination has been used by electronic device 12 for providing image content to display device 14. It should be understood that in some embodiments, information associated with a particular display device 14 may be unavailable for comparison if no previous display device 14 has been connected and/or otherwise registered with electronic device 12. Further, it should be understood that in some embodiments, decision block 204 may be associated with determining whether a predetermined schedule or interval of use indicates that the adjustment process should be performed, determining whether a change in thermal condition associated with display device 14 indicates that the adjustment process should be performed, responding to a user request for the adjustment process, or otherwise. If it is determined at decision block 204 that the particular display device 14 and/or display device 14/graphics card 22 combination is not new, the method ends. If at decision block 204 it is determined that either display device 14 or the combination of display device 14 and graphics card 22 is new and/or different from a previous display device 14 or display device 14/graphics card 22 combination, the method proceeds to block 206.

At block 206, display setup application 32 causes a display of adjustment image 36 on display device 14. At block 208, display setup application 32 interfaces and/or otherwise communicates with display device 14 to cause execution of display adjustment application 60. At block 210, display adjustment application 60 performs a display adjustment process for display device 14.

At decision block 212, a determination is made whether another display adjustment process needs to be performed. If another display adjustment process needs to be performed, the method proceeds to decision block 214, where a determination is made whether another adjustment image 36 needs to be displayed on display device 14 for the next display adjustment process. If a different adjustment image 36 is not required for the next display adjustment process, the method proceeds to block 210 where the next display adjustment process is performed by display adjustment application 60. If at decision block 214 it is determined that another adjustment image 36 is needed for the next display adjustment process, the method proceeds to block 206, where display setup application 32 causes a different adjustment image 36 to be displayed on display device 14. At decision block 212, if it is determined that another display adjustment process is not required, the method proceeds to block 216, where display setup application 32 ceases display of adjustment images 36 and/or otherwise returns display device 14 to pre-adjustment display content. The method then ends.

Thus, embodiments of system 10 automatically perform one or more display adjustments processes associated with display device 14 to enhance and/or otherwise improve the quality of image content displayed on display device 14. Further, embodiments of system 10 automatically display predefined image(s) 36 to be used during a particular display adjustment process to increase the effectiveness and/or quality of the results from the particular adjustment process. It should be understood that in the described method, certain functions may be omitted, accomplished in a sequence different from that depicted in FIG. 2, or simultaneously performed. Also, it should be understood that the method depicted in FIG. 2 may be altered to encompass any of the other features or aspects of the invention as described elsewhere in the specification. Further, embodiments of the present invention may be implemented in software and can be adapted to run on different platforms and operating systems. In particular, functions implemented by applications 32 and 60, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semi-conductor system, apparatus, device, or propagation medium.

What is claimed is:

1. An image display adjustment system, comprising:
  a display setup application executable by a processor and configured to, in response to detecting at least one characteristic associated with a display device, automatically cause an adjustment image to be displayed on the display device and an image adjustment process to be performed for the display device using the adjustment image,
  wherein the adjustment image is stored on the display device a non-volatile memory of the display device, wherein the non-volatile memory further stores extended display identification data (EDID) of the display device, the EDID regarding an identity and capabilities of the display device.

2. The system of claim 1, wherein the display setup application is stored on an electronic device couplable to the display device.

3. The system of claim 2, wherein at least one characteristic comprises detecting, by the electronic device, a different display device coupled thereto.

4. The system of claim 1, wherein the adjustment process comprises at least one of an image quality adjustment process, an image centering process, and an image sizing process.

5. The system of claim 1, wherein the display setup application is configured to automatically cause execution of a display adjustment application disposed on the display device to perform the adjustment process.

6. The system of claim 1, wherein the display setup application is configured to cease the display of the adjustment image.

7. The system of claim 1, wherein the at least one characteristic comprises detecting a particular graphics card being used for displaying image content on the display device.

8. The system of claim 1, wherein the display setup application is executable in response to a user request.

9. An image display adjustment method, comprising:
  detecting, by an electronic device, at least one characteristic associated with a display device coupled thereto;
  in response to detecting the at least one characteristic,
    obtaining an adjustment image from a memory of the display device; and
    automatically causing adjustment image to be displayed on the display device and an image adjustment process to be performed for the display device using the adjustment image wherein the memory is a non-volatile memory that further stores extended display identification data (EDID) of the display device, the EDID regarding an identity and capabilities of the display device.

10. The method of claim 9, wherein detecting the at least one display characteristic comprises detecting a different display device coupled to the electronic device.

11. The method of claim 9, wherein detecting the at least one characteristic comprises detecting a particular graphics card being used to display image content on the display device.

12. The method of claim 9, further comprising ceasing the display of the adjustment image.

13. The method of claim 9, further comprising automatically causing execution of a display adjustment application disposed on the display device to perform the adjustment process.

14. An image display adjustment system, comprising:
  means for detecting, by an electronic device means, at least one characteristic associated with a display means coupled to the electronic device means;
  means for automatically causing, in response to detecting the at least one characteristic, an adjustment image to be displayed on the display means and an image adjustment process to be performed for the display means using the adjustment image; and
  means for obtaining the adjustment image from the display means wherein a non-volatile memory of the display means is used to store the adjustment image, and the non-volatile memory further stores extended display identification data (EDID) of the display device, the EDID regarding an identity and capabilities of the display device.

15. The system of claim 14, further comprising means for detecting a different display means coupled to the electronic device means.

16. The system of claim 14, further comprising means for ceasing the display of the adjustment image.

17. The system of claim 14, further comprising means for automatically causing execution of a display adjustment application disposed on the display means to perform the adjustment process.

18. An image display adjustment system, comprising:
  a display setup application executable by a processor and configured to, according to a predetermined schedule, automatically cause an adjustment image to be displayed on the display device and an image adjustment process to be performed for the display device using the adjustment image,
  wherein the adjustment image is stored on the display device a non-volatile memory of the display device, wherein the non-volatile memory further stores extended display identification data (EDID) of the display device, the EDID regarding an identity and capabilities of the display device.

19. The system of claim 18, wherein the display setup application is stored on the display device.

* * * * *

UNITED STATES PATENT AND TRADEMARK OFFICE
CERTIFICATE OF CORRECTION

PATENT NO. : 7,760,207 B2  Page 1 of 1
APPLICATION NO. : 11/588602
DATED : July 20, 2010
INVENTOR(S) : John W. Frederick et al.

It is certified that error appears in the above-identified patent and that said Letters Patent is hereby corrected as shown below:

In column 6, line 57, in Claim 9, delete "causing" and insert -- causing the --, therefor.

In column 6, line 60, in Claim 9, delete "image" and insert -- image, --, therefor.

In column 7, line 21, in Claim 14, delete "means" and insert -- means, --, therefor.

Signed and Sealed this

Twenty-first Day of December, 2010

David J. Kappos
*Director of the United States Patent and Trademark Office*